Figure 1:
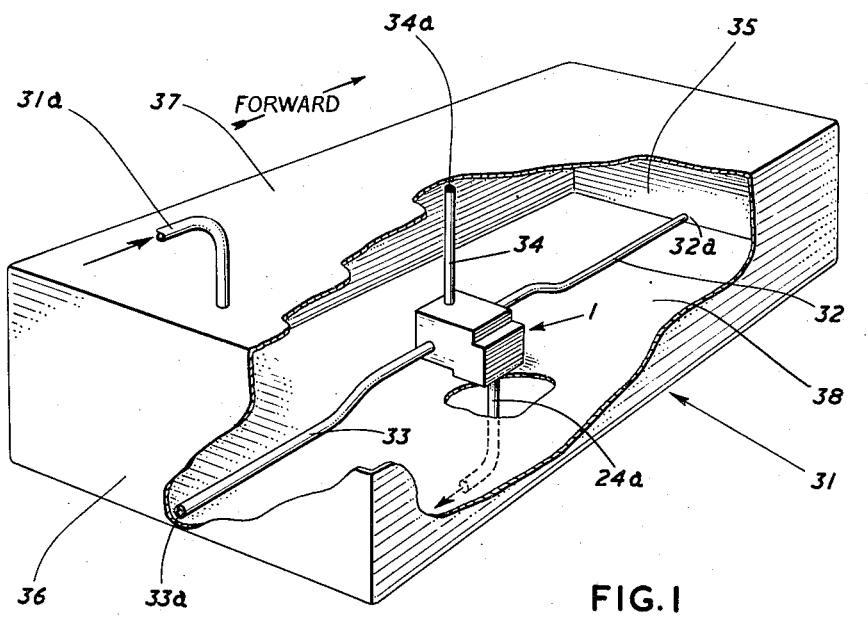

April 22, 1958     W. H. SIMCOCK     2,831,490
OUTLET SELECTOR VALVE FOR TILTABLE AND INVERTIBLE TANK
Filed Oct. 7, 1955     2 Sheets-Sheet 1

Inventor
WILLIAM HAROLD SIMCOCK
By: Maybee & Legris
Att'ys

Inventor
WILLIAM HAROLD SIMCOCK
By: Maybee & Legris
Att'ys

United States Patent Office 2,831,490
Patented Apr. 22, 1958

2,831,490

OUTLET SELECTOR VALVE FOR TILTABLE AND INVERTIBLE TANK

William Harold Simcock, Township of North York, Ontario, Canada, assignor to Orenda Engines Limited, Malton, Ontario, Canada, a corporation Application October 7, 1955, Serial No. 539,248

4 Claims. (Cl. 137—38)

This invention relates to an outlet selector valve for use with a liquid-filled tank and more particularly to a gravity-controlled outlet selector valve for use with a liquid-filled tank which is tiltable and invertible.

In a conventional upright liquid-filled tank, liquid is drawn off through an outlet at the bottom of the tank to insure a continuous supply at all times. However, to obtain a continuous supply of liquid from a tiltable and invertible tank such as an oil or fuel tank in an aircraft, outlets must be placed at various positions in the periphery of the tank in order that at least one outlet will be in the lowermost part of the tank and thus submerged no matter what orientation is assumed by the tank with respect to the downward sense of the vertical. These outlets usually lead to a common outlet conduit and consequently in pressurized circuit systems it is necessary to close all the outlets which are not submerged in order that no air can enter the outlet conduit from non-submerged outlets. To accomplish this result it is necessary to place an outlet selector valve between the tank outlet and the common outlet conduit.

The present invention provides an improved outlet selector valve for use with a tiltable and invertible tank. The valve comprises a housing having inlets leading from the tank through the housing to a common outlet and gravity-controlled valve means in tiltability-controlling and invertibility-controlling valve passages that select the appropriate inlets into the housing when the tank is tilted or inverted.

Figure 2:
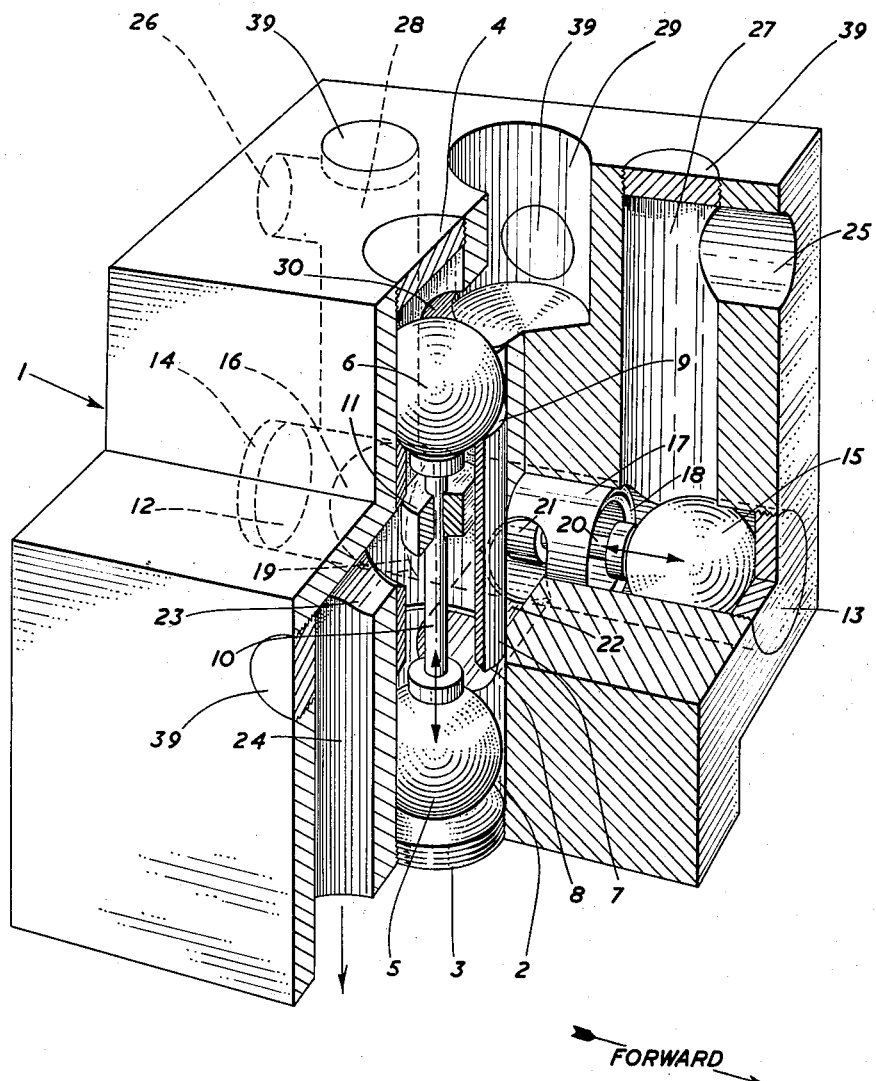

In the drawings which illustrate a preferred embodiment of the invention and in which each reference character indicates the same part in the various views:

Figure 1 is a diagrammatic perspective view showing the liquid-filled tank, a selector valve and the liquid circuit arrangement between the tank and the valve, and Fig. 2 is a perspective view, partly in section, of a preferred embodiment of the invention.

The preferred embodiment of the invention hereafter described is for use with an aircraft fuel or oil tank. The device comprises a housing 1 having an invertibility-controlling valve passage 2 bored therein and sealed at each end by plugs 3 and 4 threaded into the passage wall. Two balls 5 and 6 slide freely in passage 2 and are separated from each other by an annular liner 7 secured to the wall of passage 2. The liner 7 provides seats 8 and 9 for each of the balls 5 and 6, each seat being spaced away from plugs 3 and 4 to allow free play for each ball between its adjacent plug and seat. A push rod 10 sliding in a bushing 11 which is secured within liner 7 coaxially interacts on balls 5 and 6 and, because it is longer than the distance between the balls if both were on their seats 8 and 9, it moves one ball from its seat towards its adjacent plug when the other ball is seated. Although push rod 10 should be coaxial with liner 7, bushing 11 should be offset to provide a free passageway for fluid in passage 2.

A second, tiltability-controlling valve passage 12 is bored in the housing 1 and sealed at each end by plugs 13 and 14 threaded into the wall of the passage. Two balls 15 and 16 move freely within passage 12, one adjacent each plug 13 and 14. An annular liner 17 secured centrally in passage 12 provides seats 18 and 19 for balls 15 and 16 away from plugs 13 and 14. A push rod 20 slides on a bushing 21 secured within liner 17 and coaxially interacts on balls 15 and 16. Push rod 20 is of a length such that when ball 15 is on seat 18, ball 16 is moved off seat 19 towards plug 14. Bushing 21, like bushing 11, must be offset in passage 12 although push rod 20 should slide along the central axis of liner 17.

Passages 2 and 12 are spaced from each other and interconnected by a bore 22 which opens into passage 12 through liner 17 and into passage 2 adjacent seat 8. A bore 23 opening from liner 7 in passage 2 leads to an outlet passage 24.

Two inlet passages 25 and 26 in housing 1 are connected to passage 12 through bores 27 and 28 which open into passage 12 adjacent each seat 18 and 19 on liner 17. A third inlet 29 in housing 1 is connected to passage 2 through a bore 30 which opens into passage 2 adjacent seat 9 of liner 7.

The housing 1 is connected rigidly within a tank 31 in any convenient manner, as shown in Figure 2, and is aligned with respect to tank 31 so that invertibility-controlling valve passage 2 is coaxial with the vertical axis of the tank and tiltability-controlling valve passage 12 is coaxial with the front-rear horizontal axis of the tank as it is positioned in an aircraft in normal level flight. Inlet conduits 32, 33 and 34 are attached to inlets 25, 26 and 29 respectively, and lead therefrom. The open entry end 32a of conduit 32 is fixed within tank 31 adjacent its front wall 35, the open entry end 33a of conduit 33 is fixed within tank 31 near its rear wall 36, and the open entry end 34a of conduit 34 is fixed within tank 31 near its roof 37. The front and rear entry ends 32a and 33a should be placed near the bottom 38 of tank 31 in order to draw liquid from the tank when it is almost empty. Tank 31 will of course have a filling inlet 31a. An outlet conduit 24a is attached to outlet 24 and passes through a wall of the tank.

In the operation of the outlet selector valve, liquid will cover the front and rear entry ends 32a and 33a when tank 31 is level and upright, and will enter the housing 1 through inlets 25 or 26 from conduits 32 or 33, passing through bore 27 or 28 into passage 12. The liquid will then pass seat 18 or 19, depending on which seat is uncovered by ball 15 or 16 at the time. From passage 2 the liquid passes through bore 22 to passage 2. During level flight, seat 8 is uncovered and seat 9 is covered by the action of gravity on balls 5 and 6, allowing liquid to pass from passage 2 through bore 23 to outlet 24 but allowing no air or liquid to pass between top inlet 29 and passage 2 to outlet passage 24.

When the tank 31 tilts forwardly (when the aircraft is in a dive) the front entry end 32a will be covered by liquid which will pass through conduit 32 to inlet 25. Since housing 1 tilts simultaneously with tank 31, ball 16 is moved onto seat 19 by the force of gravity. The force of ball 16 against the push rod 20 causes the push rod to slide through bushing 21 and aid the force of gravity in moving ball 15 against plug 13. By this action liner 17 is sealed from rear inlet 26 and is opened to inlet 25, allowing liquid from front inlet 25 to pass through bore 27, through passage 12, through bore 22, through passage 2 and through bore 23 to outlet 24. Seat 8 is uncovered and seat 9 is covered on liner 7, as in level flight, preventing air or liquid from passing between top inlet 29 and passage 2 to outlet passage 24.

When tank 31 and housing 1 tilt rearwardly (when the aircraft is in a climb), ball 15 is moved onto seat 18 by the force of gravity, moving ball 16 off seat 19 and towards plug 14 by the combined force of gravity and of push rod 20. Since the rear entry end 33a is covered by liquid, the liquid will pass through conduit 33 to rear inlet 26 and thence through bore 28, through passage 12, through bore 22, through passage 2 and through bore 23 to outlet passage 24. Again, as in level flight, seat 9 is covered to prevent air or liquid from passing between inlet 29 and passage 2 to the outlet passage.

When tank 31 and housing 1 are inverted (when the aircraft is flying upside down), ball 6 is moved off seat 9 towards plug 4 and ball 5 is moved onto seat 8, both balls being actuated by gravitational force and the movement of ball 6 being aided by push rod 10. The invertibility-controlling passage 2 is thus open to flow of liquid from bore 30 to bore 23. Liquid in tank 31, lying against roof 37 due to inversion of the tank, is drawn off through the top entry end 34a and conduit 34 to top inlet 29 and passes through bore 30, through passage 2 and through bore 23 to outlet passage 24. No air or liquid can pass from either of the front and rear inlets 25 and 26 to passage 2 and the outlet.

The selector valve may conveniently be positioned outside the tank 31 if space is available. Ends 32a, 33a and 34a would then be positioned in the front wall 35, the rear wall 36 and the roof 37 respectively, conduits 32, 33 and 34 leading therefrom.

It will be understood that the form of the invention herewith shown and described is a preferred example and various modifications may be carried out without departing from the spirit of the invention or from the scope of the appended claims.

What I claim as my invention is:

1. An outlet selector valve for use with a tiltable and invertible tank comprising a housing, a tiltability-controlling valve passage in the housing, an inlet opening into each end of the said passage, gravity-controlled valve means in the passage, an invertibility-controlling valve passage in the housing, a bore leading from the tiltability-controlling valve passage into one end of the invertibility-controlling valve passage, the said valve means opening one of the said inlet openings to the bore and closing off the other from the bore when the said tiltability-controlling passage is sloping in one direction and opening the said other inlet opening to the bore and closing off the first inlet opening from the bore when the housing is tilted so that the tiltability-controlling valve passage is sloping in the other direction, a third inlet opening into one end of the invertibility-controlling valve passage, an outlet passage leading from the invertibility-controlling valve passage, and gravity-controlled valve means in the invertibility-controlling valve passage and adapted to open the bore to the outlet passage when the said one end of the invertibility-controlling passage is above the other and closing off the bore from the outlet passage and opening the third inlet opening to the outlet passage when the other end of the invertibility-controlling passage is above the said one end.

2. An outlet selector valve as claimed in claim 1 in which the gravity-controlled valve means in each of the respective passages comprise a ball located at each end of the passage, and an annular seat surrounding the passage near each end of the passage spaced from the ends of the passages so as to provide room for each ball to move by gravity off its seat to open the corresponding end of the passage.

3. An outlet selector valve as claimed in claim 2 in which the inlet openings into each end of the tiltability-controlling valve passage are between the seats and the ends of the passage, and the bore leading from the tiltability-controlling valve passage into one end of the invertibility-controlling valve passage is located between the said seats of the tiltability-controlling valve passage.

4. An outlet selector valve as claimed in claim 2 in which each passage has a push rod coaxially slidable in the passage, the length of the push rod being longer than the distance between the balls if both were on the seats in the passage so that when one ball is on its seat, the push rod will hold the other ball away from its seat to open the corresponding end of the passage.

References Cited in the file of this patent

UNITED STATES PATENTS

| | | |
|---|---|---|
| 2,239,098 | Hunter | Apr. 22, 1941 |
| 2,324,464 | Parker | July 20, 1943 |